(12) United States Patent
Michishita et al.

(10) Patent No.: US 10,988,817 B2
(45) Date of Patent: Apr. 27, 2021

(54) OXYGEN INJECTION SYSTEM FOR A DIRECT REDUCTION PROCESS

(71) Applicant: Midrex Technologies, Inc., Charlotte, NC (US)

(72) Inventors: Haruyasu Michishita, Charlotte, NC (US); Antonio Elliot, Charlotte, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 160 days.

(21) Appl. No.: 16/365,086

(22) Filed: Mar. 26, 2019

(65) Prior Publication Data

US 2019/0300974 A1  Oct. 3, 2019

Related U.S. Application Data

(60) Provisional application No. 62/648,550, filed on Mar. 27, 2018.

(51) Int. Cl.
*C21B 5/00* (2006.01)

(52) U.S. Cl.
CPC .................................. *C21B 5/001* (2013.01)

(58) Field of Classification Search
CPC ........ C21B 5/001; C21B 13/00; C21B 13/006
See application file for complete search history.

(56) References Cited

U.S. PATENT DOCUMENTS

| 3,637,343 | A | 1/1972 | Hirt |
| 5,997,596 | A | 12/1999 | Joshi et al. |
| 6,395,055 | B1 | 5/2002 | Bueno et al. |
| 6,464,928 | B1 | 10/2002 | Lipukin et al. |
| 6,506,230 | B2 | 1/2003 | Montague et al. |
| 2002/0007699 | A1 | 1/2002 | Montague et al. |
| 2019/0300974 | A1* | 10/2019 | Michishita .............. F23D 14/62 |

OTHER PUBLICATIONS

Jun. 6, 2019 International Search Report Issued for International Application PCT/US 19/23832.

* cited by examiner

*Primary Examiner* — Scott R Kastler
(74) *Attorney, Agent, or Firm* — Clements Bernard Walker; Christopher L. Bernard

(57) ABSTRACT

An oxygen injection system for a direct reduction process, including: a common circumferential gas injection header adapted to be coupled to an oxygen source and an enrichment natural gas source and adapted to deliver oxygen from the oxygen source and enrichment natural gas from the enrichment natural gas source to a reducing gas stream flowing through a conduit axially disposed within the common circumferential gas injection header through a plurality of circumferentially disposed ports to form a bustle gas stream; wherein the common circumferential gas injection header includes a circumferential oxygen injection header adapted to deliver the oxygen from the oxygen source to the reducing gas stream through the plurality of circumferentially disposed ports and a circumferential enrichment natural gas injection header adapted to deliver the enrichment natural gas from the enrichment natural gas source to the reducing gas stream through the plurality of circumferentially disposed ports.

19 Claims, 3 Drawing Sheets

OXYGEN INJECTION SYSTEM FOR A DIRECT REDUCTION PROCESS

CROSS-REFERENCE TO RELATED APPLICATION

The present disclosure claims the benefit of priority of U.S. Provisional Patent Application No. 62/648,550, filed on Mar. 27, 2018, and entitled "OXYGEN INJECTION SYSTEM FOR A DIRECT REDUCTION PROCESS," the contents of which are incorporated in full by reference herein for all purposes.

BACKGROUND

Referring specifically to FIG. 1, in a conventional direct reduction (DR) process, a heated reducing gas 10, consisting mostly of H2 and CO made by natural gas reforming, (or syngas) is fed into a shaft furnace (SF) through a bustle and tuyere system to reduce iron oxides to metallized iron. Typically, an enrichment hydrocarbon fuel, such as enrichment natural gas (EnNG) 12, and O2 14 are injected into the reducing gas stream 10 before entering the SF. The EnNG 12 acts as a chemical feedstock for in-situ reforming inside the SF, increasing reduction by making more reductant. However, this in-situ reforming consumes a significant amount of heat, which reduces the bed temperature and lowers the kinetics of the reduction reactions in the SF. Combustion of the injected O2 14 with the reducing gas 10 maintains the temperature of the bustle gas at about 900 degrees C. or more before entering the SF and compensates for the heat consumed by the in-situ reforming inside the SF.

Typically, the O2 14 is injected into the conduit 16 used through a single pipe and the EnNG 12 is injected through several pipes laid out circumferentially. These pipes 12,14 are self-cooled by the flowing gas alone, unless water-cooled pipes are used. The O2 14 and EnNG 12 are injected at different locations along the conduit 16 to ensure the stable and safe combustion of the O2 14, as the cooling effect of the EnNG 12 may impair the combustion and/or ignition. An inert gas purge 20 is fluidly coupled to the O2 injection pipe 14. Generally, the single O2 injection pipe 14 incorporates one or two O2 injection nozzles, while the EnNG injection pipe 12 is coupled to a circumferential header 22 that includes four to eight circumferential injection holes, for example.

In general, this configuration suffers from several important problems:

(1) there is limited turn-down capability of the O2 flow 14 through the injection pipe because the O2 flow rate sufficient for self-cooling must be maintain and the O2 supply cannot be depleted;

(2) only a small number of O2 injection pipes 14 can be used because of this reduced turn-down capability of O2 for each pipe and a smaller number of O2 injection points makes it difficult to distribute the O2 14 uniformly in the resulting bustle gas stream 18;

(3) the duct wall around the O2 injection point can develop a hot spot due to the radiation heat of the O2 flame unless the O2 injection pipe 14 projects far enough through the duct wall—this longer projection potentially causing bending of the O2 injection pipe 14, requiring frequent replacing of the O2 injection pipe 14;

(4) to solve the above problems, a water-cooled O2 injection pipe 14 can be used, but this makes the overall system more complex and expensive, and the water cooling of the water-cooled O2 injection pipe 14 could fail; and (5) although there is minimal chance of the O2 14 reacting with the EnNG 12 since they are injected at different locations, while the EnNG 12 remains mostly unreacted and tends to lower the bustle gas temperature, the O2 14 reacts mainly with the H2 and CO in the reducing gas stream 10 to decrease the amount of reductant and maximize the temperature rise through full oxidation.

Thus, an improved O2 and EnNG injection system that solves these problems is needed for DR processes.

SUMMARY

In various exemplary embodiments, the present disclosure improves the flow rate flexibility for an O2 injection pipe without applying water-cooling. The number of O2 injection points is increased, such that the O2 and EnNG can be distributed more uniformly in the bustle gas stream. Further, the present disclosure makes it possible to safely inject O2 very close to the point of EnNG injection, such that the partial combustion of the EnNG is enhanced and the temperature of the reducing gas entering the SF is reduced as compared to a full oxidation configuration.

The present disclosure optimizes the O2/EnNG ratio at the O2 injection location to maximize partial combustion and minimize C deposition. This is achieved by:

(1) cooling the O2 injection pipes using EnNG shroud gas in a coaxial EnNG/O2 injection configuration;

(2) the turndown capability of the O2 flow rate, or the possible zero O2 flow, for each pipe enabled by (1) enables the number of injection points to be increased, thus distributing O2 more uniformly in the bustle gas stream;

(3) the smaller diameter injection pipe for O2 is located inside the large diameter EnNG shroud gas hole to maintain a much higher gas velocity of O2 than that of EnNG, preventing too much cooling by EnNG in the O2 combustion area and stabilizing the O2 combustion even with the coaxial EnNG/O2 injection configuration;

(4) a brick orifice located upstream prevents the flows around the O2/EnNG injection locations from becoming too disturbed—the coaxial EnNG/O2 injection configuration with the combination of the brick orifice upstream significantly enhancing the partial combustion of EnNG, generating reducing gas while minimizing the temperature increase of the reducing gas; and (5) with the above, C deposition may occur around the O2 injection points if the amount of heavies in the EnNG is high or if the EnNG/O2 flow ratio is high—dividing the EnNG injection into two locations (one around the O2 injection location and another further downstream) optimizes the O2/EnNG ratio at the O2 injection location to maximize partial combustion and minimize C deposition.

In one exemplary embodiment, the present disclosure provides an oxygen injection system for a direct reduction process, including: a common circumferential gas injection header adapted to be coupled to an oxygen source and an enrichment natural gas source and adapted to deliver oxygen from the oxygen source and enrichment natural gas from the enrichment natural gas source to a reducing gas stream flowing through a conduit axially disposed within the common circumferential gas injection header through a plurality of circumferentially disposed ports to form a bustle gas stream; wherein the common circumferential gas injection header includes a circumferential oxygen injection header adapted to deliver the oxygen from the oxygen source to the reducing gas stream through the plurality of circumferentially disposed ports and a circumferential enrichment natural gas injection header adapted to deliver the enrichment natural gas from the enrichment natural gas source to the reducing gas stream through the plurality of circumferentially disposed ports. The circumferential oxygen injection header and the circumferential enrichment natural gas injection header are axially disposed. Optionally, the circumferential enrichment natural gas injection header is axially disposed within the circumferential oxygen injection header. The circumferential oxygen injection header includes a plurality of circumferentially disposed pipes adapted to be disposed through the circumferential enrichment natural gas injection header and a plurality of circumferentially disposed nozzles coupled to the plurality of circumferentially disposed pipes adapted to be collocated with the plurality of circumferentially disposed ports. The oxygen flow rate through each of the plurality of circumferentially disposed pipes is variable. Optionally, the enrichment gas flow rate through each of the plurality of circumferentially disposed ports is variable. The oxygen injection system further includes an inert gas purge coupled to the oxygen source. The oxygen injection system further includes a brick orifice circumferentially disposed about the conduit upstream of the common circumferential gas injection header. Optionally, the oxygen injection system further includes another circumferential enrichment natural gas injection header disposed about the conduit downstream of the common circumferential gas injection header and adapted to deliver additional enrichment natural gas from the enrichment natural gas source to the reducing gas stream through an additional plurality of circumferentially disposed ports.

In another exemplary embodiment, the present disclosure provides an oxygen injection method for a direct reduction process, including: providing a common circumferential gas injection header adapted to be coupled to an oxygen source and an enrichment natural gas source and adapted to deliver oxygen from the oxygen source and enrichment natural gas from the enrichment natural gas source to a reducing gas stream flowing through a conduit axially disposed within the common circumferential gas injection header through a plurality of circumferentially disposed ports to form a bustle gas stream; wherein the common circumferential gas injection header includes a circumferential oxygen injection header adapted to deliver the oxygen from the oxygen source to the reducing gas stream through the plurality of circumferentially disposed ports and a circumferential enrichment natural gas injection header adapted to deliver the enrichment natural gas from the enrichment natural gas source to the reducing gas stream through the plurality of circumferentially disposed ports. The circumferential oxygen injection header and the circumferential enrichment natural gas injection header are axially disposed. Optionally, the circumferential enrichment natural gas injection header is axially disposed within the circumferential oxygen injection header. The circumferential oxygen injection header includes a plurality of circumferentially disposed pipes adapted to be disposed through the circumferential enrichment natural gas injection header and a plurality of circumferentially disposed nozzles coupled to the plurality of circumferentially disposed pipes adapted to be collocated with the plurality of circumferentially disposed ports. The oxygen injection method further includes varying an oxygen flow rate through each of the plurality of circumferentially disposed pipes. Optionally, the oxygen injection method further includes varying an enrichment gas flow rate through each of the plurality of circumferentially disposed ports. The oxygen injection method further includes providing an inert gas purge coupled to the oxygen source. The oxygen injection method further includes providing a brick orifice circumferentially disposed about the conduit upstream of the common circumferential gas injection header. Optionally, the oxygen injection method further includes providing another circumferential enrichment natural gas injection header disposed about the conduit downstream of the common circumferential gas injection header and adapted to deliver additional enrichment natural gas from the enrichment natural gas source to the reducing gas stream through an additional plurality of circumferentially disposed ports.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF EMBODIMENTS

Again, in various exemplary embodiments, the present disclosure improves the flow rate flexibility for an O2 injection pipe without applying water-cooling. The number of O2 injection points is increased, such that the O2 and EnNG can be distributed more uniformly in the bustle gas stream. Further, the present disclosure makes it possible to safely inject O2 very close to the point of EnNG injection, such that the partial combustion of the EnNG is enhanced and the temperature of the reducing gas entering the SF is reduced as compared to a full oxidation configuration.

The present disclosure optimizes the O2/EnNG ratio at the O2 injection location to maximize partial combustion and minimize C deposition. This is achieved by:

(1) cooling the O2 injection pipes using EnNG shroud gas in a coaxial EnNG/O2 injection configuration;

(2) the turndown capability of the O2 flow rate, or the possible zero O2 flow, for each pipe enabled by (1) enables the number of injection points to be increased, thus distributing O2 more uniformly in the bustle gas stream;

(3) the smaller diameter injection pipe for O2 is located inside the large diameter EnNG shroud gas hole to maintain a much higher gas velocity of O2 than that of EnNG, preventing too much cooling by EnNG in the O2 combustion area and stabilizing the O2 combustion even with the coaxial EnNG/O2 injection configuration;

(4) a brick orifice located upstream prevents the flows around the O2/EnNG injection locations from becoming too disturbed—the coaxial EnNG/O2 injection configuration with the combination of the brick orifice upstream significantly enhancing the partial combustion of EnNG, generating reducing gas while minimizing the temperature increase of the reducing gas; and (5) with the above, C deposition may occur around the O2 injection points if the amount of heavies in the EnNG is high or if the EnNG/O2 flow ratio is high—dividing the EnNG injection into two locations (one around the O2 injection location and another further downstream) optimizes the O2/EnNG ratio at the O2 injection location to maximize partial combustion and minimize C deposition.

Figure 1:
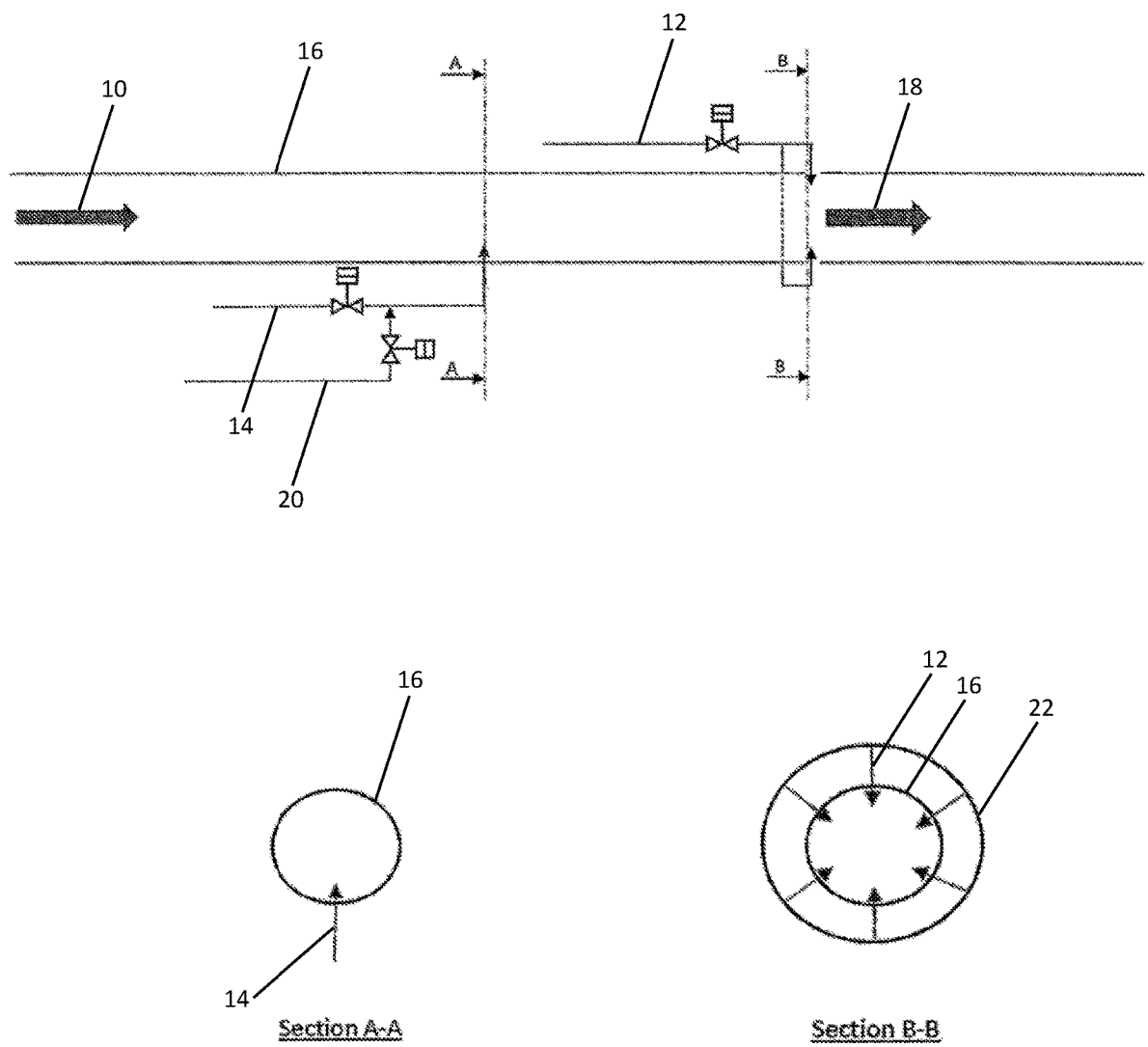
FIG. 1 is a schematic diagram illustrating a conventional O2 and EnNG injection system and method, utilizing separate O2 and EnNG injection points.
Figure 2:
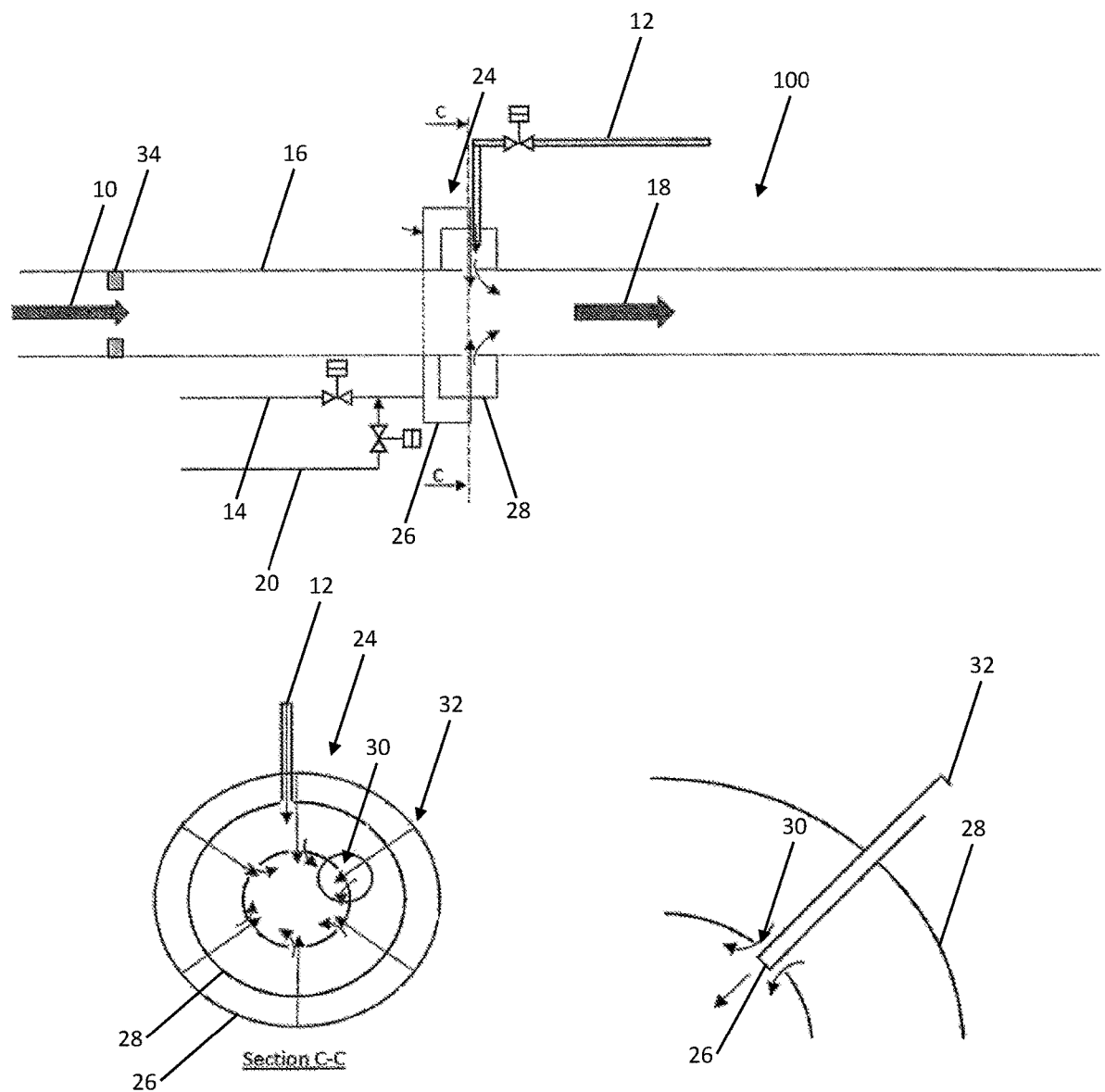
FIG. 2 is a schematic diagram illustrating one exemplary embodiment of the O2 and EnNG system and method of the present disclosure, utilizing common, coaxial O2 and EnNG injection points.

Referring now specifically to FIG. 2, in one exemplary embodiment, the common O2 and EnNG injection system 100 of the present disclosure utilizes coaxial O2 14 and EnNG 12 injection at the same location, through a common circumferential injection header 24 disposed around the reducing gas conduit 16, thereby forming bustle gas 18 that is delivered to the SF. The common circumferential injection header 24 includes an outer circumferential O2 injection header 26 and an inner circumferential EnNG injection header 28 that collectively utilize a plurality of common circumferential gas injection ports 30. In this exemplary embodiment, each of the O2 injection pipes 32 is disposed along a radius of the common circumferential injection header 24 through the inner circumferential EnNG injection header 28, and collocated with and protruding through one of the circumferential EnNG injection ports 30. An inert gas purge 20 is coupled to the O2 14 as before.

Thus, the O2 pipe 32 is cooled by the EnNG shroud gas coming out of the circumferential holes 30 of the EnNG header 28 installed on the bustle gas duct 16. This allows more flexibility and turndown capability (including zero flow) of the O2 flow rate for each O2 injection pipe 32.

The flexibility of this O2 flow makes it possible to increase the number of O2 and EnNG injection points circumferentially and distributes O2 and EnNG more uniformly in the bustle gas stream 18. Further, it provides the flexibility to stop the O2 flow to some of the O2 injection pipes 32 without removing them from the system 100.

By applying smaller diameter O2 injection pipes 32 inside the larger diameter EnNG shroud gas hole 30 to maintain higher gas velocity for the O2 than that of the EnNG, stable O2 combustion can be achieved without being influenced by the cooling effect of the EnNG. This makes it possible to safely inject the O2 close to the injection point of the EnNG in the reducing gas duct 16.

The EnNG shroud gas coming out of the shroud gas hole 30 protects the refractory-lined duct wall around the O2 pipes 32 from the radiation heat of the O2 flame, even though the projection of the O2 pipes 32 from the refractory wall is minimal. Such minimal projection thereby extends the life of the O2 injection pipes 32.

A brick orifice 34 or the like is disposed upstream of the common circumferential header 24 and prevents turbulent flow around the O2/EnNG injection location. This coaxial O2/EnNG injection configuration coupled with the brick orifice 34 disposed upstream significantly enhances the partial combustion of the EnNG 12.

Figure 3:
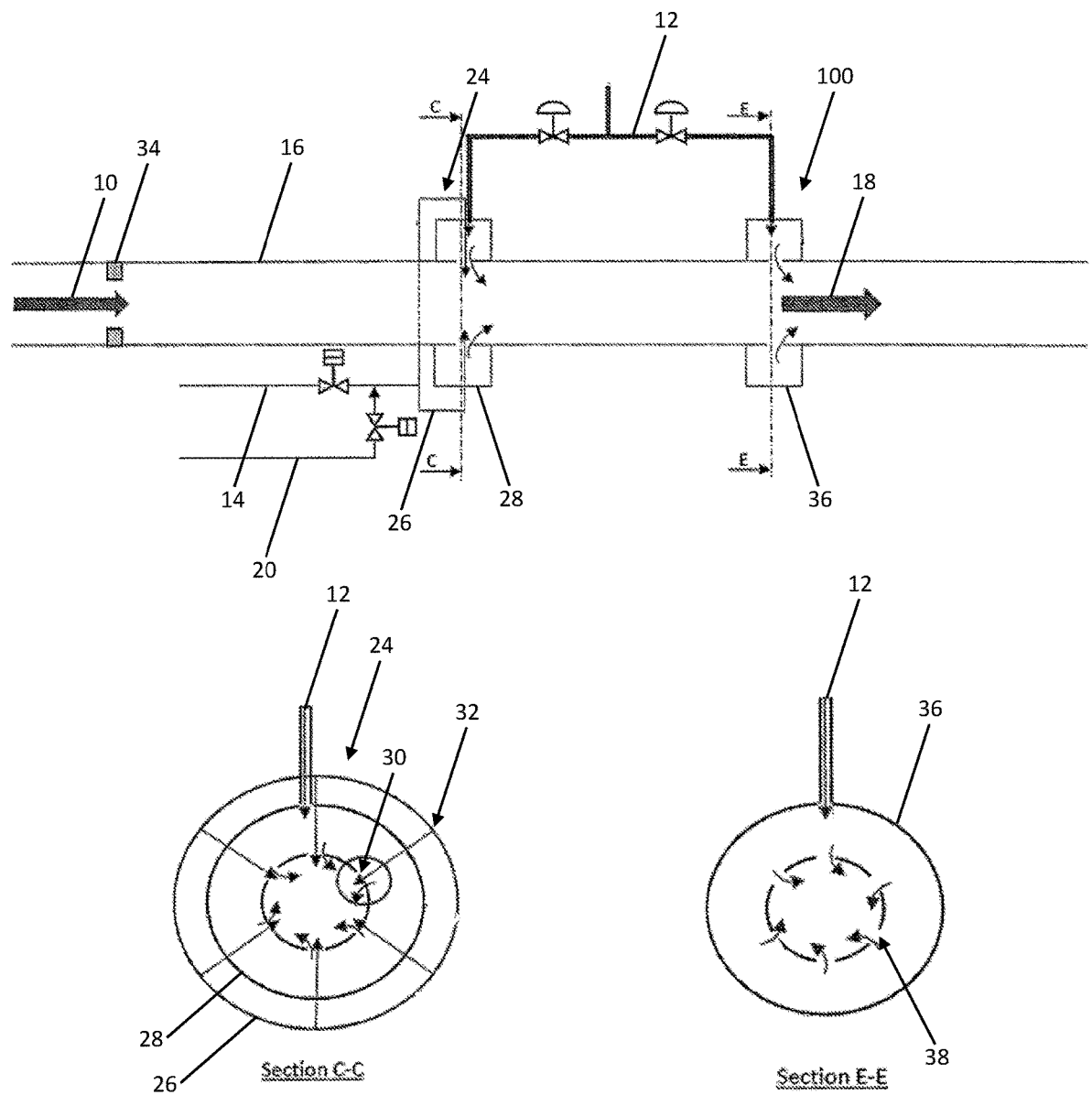
FIG. 3 is a schematic diagram illustrating another exemplary embodiment of the O2 and EnNG system and method of the present disclosure, utilizing common, coaxial O2 and EnNG injection points, as well as a separate EnNG injection point.

Referring now specifically to FIG. 3, in another exemplary embodiment, the common O2 and EnNG injection system 100 of the present disclosure again utilizes coaxial O2 14 and EnNG 12 injection at the same location, through a common circumferential injection header 24 disposed around the reducing gas conduit 16, thereby forming bustle gas 18 that is delivered to the SF. The common circumferential injection header 24 includes an outer circumferential O2 injection header 26 and an inner circumferential EnNG injection header 28 that collectively utilize a plurality of common circumferential gas injection ports 30. In this exemplary embodiment, each of the O2 injection pipes 14 is disposed along a radius of the common circumferential injection header 24 through the inner circumferential EnNG injection header 28, and collocated with and protruding through one of the circumferential EnNG injection ports 30. An inert gas purge 20 is coupled to the O2 14 as before.

Thus, the O2 pipe 32 is cooled by the EnNG shroud gas 12 coming out of the circumferential holes 30 of the EnNG header 28 installed on the bustle gas duct 16. This allows more flexibility and turndown capability (including zero flow) of the O2 flow rate for each O2 injection pipe 32.

The flexibility of this O2 flow makes it possible to increase the number of O2 and EnNG injection points circumferentially and distributes O2 and EnNG more uniformly in the bustle gas stream 18. Further, it provides the flexibility to stop the O2 flow to some of the O2 injection pipes 32 without removing them from the system 100.

By applying smaller diameter O2 injection pipes 32 inside the larger diameter EnNG shroud gas hole 30 to maintain higher gas velocity for the O2 than that of the EnNG, stable O2 combustion can be achieved without being influenced by the cooling effect of the EnNG. This makes it possible to safely inject the O2 close to the injection point of the EnNG in the reducing gas duct 16.

The EnNG shroud gas coming out of the shroud gas hole 30 protects the refractory-lined duct wall around the O2 pipes 32 from the radiation heat of the O2 flame, even though the projection of the O2 pipe 32 from the refractory wall is minimal. Such minimal projection thereby extends the life of the O2 injection pipe 32.

Again, a brick orifice 34 or the like is disposed upstream of the common circumferential header 24 and prevents turbulent flow around the O2/EnNG injection location. This coaxial O2/EnNG injection configuration coupled with the brick orifice 34 disposed upstream significantly enhances the partial combustion of the EnNG 12.

Here, a separate downstream circumferential EnNG injection header 36 is also coupled to the EnNG supply 12 and utilized, injecting the EnNG into the bustle gas stream 18 within the duct 16 through a plurality of separate circumferential EnNG injection ports 38. In the first embodiment, with the O2/EnNG coaxial injection configuration, C deposition may occur around the O2 injection points if the amount of heavies in the EnNG is high or if the EnNG/O2 flow ratio is high. Dividing the EnNG injection into two locations (one around the O2 injection location and another at a location downstream) allows to O2/EnNG ratio at the O2 injection location to be optimized to maximize the partial combustion and minimize the C deposition. The optimum ratio is O2/EnNG=0.5~1.2, or preferably 0.7~1.0, on a molar/volume basis.

Thus, again, the present disclosure improves the flow rate flexibility for an O2 injection pipe without applying water-cooling. The number of O2 injection points is increased, such that the O2 and EnNG can be distributed more uniformly in the bustle gas stream. Further, the present disclosure makes it possible to safely inject O2 very close to the point of EnNG injection, such that the partial combustion of the EnNG is enhanced and the temperature of the reducing gas entering the SF is reduced as compared to a full oxidation configuration.

The present disclosure optimizes the O2/EnNG ratio at the O2 injection location to maximize partial combustion and minimize C deposition. This is achieved by:

(1) cooling the O2 injection pipes using EnNG shroud gas in a coaxial EnNG/O2 injection configuration;

(2) the turndown capability of the O2 flow rate, or the possible zero O2 flow, for each pipe enabled by (1) enables the number of injection points to be increased, thus distributing O2 more uniformly in the bustle gas stream;

(3) the smaller diameter injection pipe for O2 is located inside the large diameter EnNG shroud gas hole to maintain a much higher gas velocity of O2 than that of EnNG, preventing too much cooling by EnNG in the O2 combustion area and stabilizing the O2 combustion even with the coaxial EnNG/O2 injection configuration;

(4) a brick orifice located upstream prevents the flows around the O2/EnNG injection locations from becoming too disturbed—the coaxial EnNG/O2 injection configuration with the combination of the brick orifice upstream significantly enhancing the partial combustion of EnNG, generating reducing gas while minimizing the temperature increase of the reducing gas; and (5) with the above, C deposition may occur around the O2 injection points if the amount of heavies in the EnNG is high or if the EnNG/O2 flow ratio is high—dividing the EnNG injection into two locations (one around the O2 injection location and another further downstream) optimizes the O2/EnNG ratio at the O2 injection location to maximize partial combustion and minimize C deposition.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. An oxygen injection system for a direct reduction process, comprising:
a common circumferential gas injection header adapted to be coupled to an oxygen source and an enrichment natural gas source and adapted to deliver oxygen from the oxygen source and enrichment natural gas from the enrichment natural gas source to a reducing gas stream flowing through a conduit axially disposed within the common circumferential gas injection header through a plurality of circumferentially disposed ports to form a bustle gas stream;
wherein the common circumferential gas injection header is formed by a circumferential oxygen injection header adapted to deliver the oxygen from the oxygen source to the reducing gas stream through the plurality of circumferentially disposed ports and a circumferential enrichment natural gas injection header adapted to deliver the enrichment natural gas from the enrichment natural gas source to the reducing gas stream through the plurality of circumferentially disposed ports; and
wherein the circumferential enrichment natural gas injection header is axially disposed within the circumferential oxygen injection header.

2. The oxygen injection system of claim 1, wherein the circumferential oxygen injection header comprises a plurality of circumferentially disposed pipes adapted to be disposed through the circumferential enrichment natural gas injection header and a plurality of circumferentially disposed nozzles coupled to the plurality of circumferentially disposed pipes adapted to be collocated with the plurality of circumferentially disposed ports.

3. The oxygen injection system of claim 2, wherein each of the plurality of circumferentially disposed pipes is adapted to deliver a variable oxygen flow rate.

4. The oxygen injection system of claim 2, wherein each of the plurality of circumferentially disposed ports is adapted to deliver a variable enrichment gas flow rate.

5. The oxygen injection system of claim 1, further comprising an inert gas purge coupled to the oxygen source.

6. The oxygen injection system of claim 1, further comprising a brick orifice circumferentially disposed about the conduit upstream of the common circumferential gas injection header.

7. The oxygen injection system of claim 1, further comprising another circumferential enrichment natural gas injection header disposed about the conduit downstream of the common circumferential gas injection header and adapted to deliver additional enrichment natural gas from the enrichment natural gas source to the reducing gas stream through an additional plurality of circumferentially disposed ports.

8. An oxygen injection method for a direct reduction process, comprising:
providing a common circumferential gas injection header adapted to be coupled to an oxygen source and an enrichment natural gas source and adapted to deliver oxygen from the oxygen source and enrichment natural gas from the enrichment natural gas source to a reducing gas stream flowing through a conduit axially disposed within the common circumferential gas injection header through a plurality of circumferentially disposed ports to form a bustle gas stream;
wherein the common circumferential gas injection header is formed by a circumferential oxygen injection header adapted to deliver the oxygen from the oxygen source to the reducing gas stream through the plurality of circumferentially disposed ports and a circumferential enrichment natural gas injection header adapted to deliver the enrichment natural gas from the enrichment natural gas source to the reducing gas stream through the plurality of circumferentially disposed ports; and
wherein the circumferential enrichment natural gas injection header is axially disposed within the circumferential oxygen injection header.

9. The oxygen injection method of claim 8, wherein the circumferential oxygen injection header comprises a plurality of circumferentially disposed pipes adapted to be disposed through the circumferential enrichment natural gas injection header and a plurality of circumferentially disposed nozzles coupled to the plurality of circumferentially disposed pipes adapted to be collocated with the plurality of circumferentially disposed ports.

10. The oxygen injection method of claim 9, further comprising varying an oxygen flow rate through each of the plurality of circumferentially disposed pipes.

11. The oxygen injection method of claim 9, further comprising varying an enrichment gas flow rate through each of the plurality of circumferentially disposed ports.

12. The oxygen injection method of claim 9, wherein a flow ratio of the oxygen to the enrichment natural gas is 0.5 to 1.2 on a molar/volume basis.

13. The oxygen injection method of claim 8, further comprising providing an inert gas purge coupled to the oxygen source.

14. The oxygen injection method of claim 8, further comprising providing a brick orifice circumferentially disposed about the conduit upstream of the common circumferential gas injection header.

15. The oxygen injection method of claim 8, further comprising providing another circumferential enrichment natural gas injection header disposed about the conduit downstream of the common circumferential gas injection header and adapted to deliver additional enrichment natural gas from the enrichment natural gas source to the reducing gas stream through an additional plurality of circumferentially disposed ports.

16. An oxygen injection system for a direct reduction process, comprising:
    a common circumferential gas injection header adapted to be coupled to an oxygen source and an enrichment natural gas source and adapted to deliver oxygen from the oxygen source and enrichment natural gas from the enrichment natural gas source to a reducing gas stream flowing through a conduit axially disposed within the common circumferential gas injection header through a plurality of circumferentially disposed ports to form a bustle gas stream;
    wherein the common circumferential gas injection header is formed by a circumferential oxygen injection header adapted to deliver the oxygen from the oxygen source to the reducing gas stream through the plurality of circumferentially disposed ports and a circumferential enrichment natural gas injection header adapted to deliver the enrichment natural gas from the enrichment natural gas source to the reducing gas stream through the plurality of circumferentially disposed ports; and
    another circumferential enrichment natural gas injection header disposed about the conduit downstream of the common circumferential gas injection header and adapted to deliver additional enrichment natural gas from the enrichment natural gas source to the reducing gas stream through an additional plurality of circumferentially disposed ports.

17. The oxygen injection system of claim 16, wherein the circumferential oxygen injection header and the circumferential enrichment natural gas injection header are axially disposed.

18. The oxygen injection system of claim 17, wherein the circumferential enrichment natural gas injection header is axially disposed within the circumferential oxygen injection header.

19. The oxygen injection system of claim 18, wherein the circumferential oxygen injection header comprises a plurality of circumferentially disposed pipes adapted to be disposed through the circumferential enrichment natural gas injection header and a plurality of circumferentially disposed nozzles coupled to the plurality of circumferentially disposed pipes adapted to be collocated with the plurality of circumferentially disposed ports.

* * * * *